(12) United States Patent
O'Sullivan et al.

(10) Patent No.: US 12,457,491 B2
(45) Date of Patent: Oct. 28, 2025

(54) NORMALIZING AND SECURELY TRANSMITTING TELEMATICS DATA

(71) Applicant: Vinli, Inc., Dallas, TX (US)

(72) Inventors: Shayne O'Sullivan, Dallas, TX (US); Mahmoud Haidar, Dallas, TX (US); Vann Walke, Dallas, TX (US); Shawn Casey, Dallas, TX (US); Stephen Sheaffer, Dallas, TX (US); Matthew Himelfarb, Dallas, TX (US)

(73) Assignee: VINLI, INC., Dallas, TX (US)

( * ) Notice: Subject to any disclaimer, the term of this patent is extended or adjusted under 35 U.S.C. 154(b) by 96 days.

(21) Appl. No.: 17/881,361

(22) Filed: Aug. 4, 2022

(65) Prior Publication Data

US 2023/0038428 A1 Feb. 9, 2023

Related U.S. Application Data

(60) Provisional application No. 63/229,935, filed on Aug. 5, 2021.

(51) Int. Cl.
*H04W 12/02* (2009.01)
*H04W 12/06* (2021.01)
*H04W 12/30* (2021.01)
*H04W 12/63* (2021.01)

(52) U.S. Cl.
CPC ........... *H04W 12/02* (2013.01); *H04W 12/06* (2013.01); *H04W 12/30* (2021.01); *H04W 12/63* (2021.01)

(58) Field of Classification Search
None
See application file for complete search history.

(56) References Cited

U.S. PATENT DOCUMENTS 7,401,233 B2   7/2008  Duri et al.
7,610,210 B2  10/2009  Helitzer et al.
8,055,403 B2   8/2011  Lowrey et al.
(Continued)

OTHER PUBLICATIONS

US/ISR—International Search Report and Written Opinion mailed on Oct. 28, 2022, for related International Appln. No. PCT/US2022/039448, 20 pgs.

(Continued)

*Primary Examiner* — Sanchit K Sarker
(74) *Attorney, Agent, or Firm* — MYERS BIGEL, P.A.

(57) ABSTRACT

Methods, systems, and storage media for securely transmitting information are disclosed. Exemplary implementations may: receive a user identification token from a mobile device associated with a first user; verify an identity of the first user utilizing the user identification token; provide a positive response token to the mobile device associated with the first user indicating the identity of the first user has been verified; based on providing the positive response token, receive telematics data, the user identification token, and a timestamp from the mobile device associated with the first user; normalize the received telematics data; based on privacy settings derived from the mobile device associated with the first user, receive permission, from the first user, to share the normalized telematics data; and based on receiving permission, from the first user, to share the normalized telematics data, transmitting at least a portion of the normalized telematics data to a second user.

18 Claims, 9 Drawing Sheets

(56) References Cited

U.S. PATENT DOCUMENTS

| | | |
|---|---|---|
| 8,078,390 B2 | 12/2011 | Menzel et al. |
| 8,117,049 B2 | 2/2012 | Berkobin et al. |
| 8,180,522 B2 | 5/2012 | Tuff |
| 8,180,655 B1 | 5/2012 | Hopkins, III |
| 8,191,400 B2 | 5/2012 | Avery |
| 8,339,251 B2 | 12/2012 | Roberts, Sr. et al. |
| 8,522,596 B2 | 3/2013 | Avery |
| 8,457,880 B1 | 4/2013 | Malalur et al. |
| 8,390,474 B2 | 5/2013 | Yi et al. |
| 8,577,703 B2 | 5/2013 | Mcclellan et al. |
| 8,352,118 B1 | 8/2013 | Mittelsteadt et al. |
| 8,416,067 B2 | 9/2013 | Davidson et al. |
| 8,538,785 B2 | 9/2013 | Coleman et al. |
| 8,635,091 B2 | 1/2014 | Amigo et al. |
| 8,768,734 B2 | 1/2014 | Gryan et al. |
| 8,880,285 B2 | 4/2014 | Miners et al. |
| 8,731,768 B2 | 5/2014 | Fernandes et al. |
| 8,799,036 B1 | 5/2014 | Christensen et al. |
| 8,799,032 B2 | 7/2014 | Fernandes et al. |
| 8,854,199 B2 | 7/2014 | Cook et al. |
| 8,862,486 B2 | 10/2014 | Cordova et al. |
| 9,121,720 B2 | 1/2015 | Kim |
| 9,037,345 B2 | 5/2015 | Inoue |
| 9,037,394 B2 | 5/2015 | Fernandes et al. |
| 9,043,041 B2 | 5/2015 | Willis et al. |
| 8,928,495 B2 | 6/2015 | Hassib et al. |
| 8,930,229 B2 | 6/2015 | Bowne et al. |
| 8,930,231 B2 | 6/2015 | Bowne et al. |
| 9,067,565 B2 | 6/2015 | Mcclellan et al. |
| 9,070,168 B2 | 6/2015 | Amigo et al. |
| 9,081,650 B1 | 7/2015 | Brinkmann et al. |
| 9,127,946 B1 | 8/2015 | Menon et al. |
| 9,053,516 B2 | 9/2015 | Stempora |
| 9,141,582 B1 | 9/2015 | Brinkmann et al. |
| 9,141,995 B1 | 9/2015 | Brinkmann et al. |
| 9,104,535 B1 | 11/2015 | Brinkmann et al. |
| 9,272,714 B2 | 1/2016 | Rao et al. |
| 9,481,373 B2 | 1/2016 | Basir et al. |
| 9,285,223 B1 | 3/2016 | Menon et al. |
| 9,329,200 B2 | 3/2016 | Avery |
| 9,228,836 B2 | 5/2016 | Girod et al. |
| 9,513,128 B1 | 6/2016 | Menon et al. |
| 9,395,384 B1 | 7/2016 | Dosher et al. |
| 9,398,423 B2 | 7/2016 | Cordova et al. |
| 9,489,781 B2 | 8/2016 | Healy et al. |
| 9,477,639 B2 | 10/2016 | Fischer et al. |
| 9,311,676 B2 | 12/2016 | Helitzer et al. |
| 9,390,452 B1 | 12/2016 | Biemer et al. |
| 9,519,905 B2 | 12/2016 | Basir |
| 9,524,593 B2 | 12/2016 | Amigo et al. |
| 9,558,520 B2 | 1/2017 | Peak et al. |
| 9,558,656 B1 | 1/2017 | Brickmann et al. |
| 9,633,488 B2 | 4/2017 | Carnell et al. |
| 9,697,491 B2 | 4/2017 | Keaveny et al. |
| 9,754,425 B1 | 5/2017 | Lqbal et al. |
| 9,836,062 B1 | 5/2017 | Hayward |
| 9,836,962 B1 | 5/2017 | Hayward |
| 9,836,963 B1 | 5/2017 | Hayward |
| 9,672,569 B2 | 6/2017 | Fernandes et al. |
| 9,672,571 B2 | 6/2017 | Fernandes et al. |
| 9,676,392 B1 | 6/2017 | Brinkmann et al. |
| 9,679,487 B1 | 6/2017 | Hayward |
| 9,688,286 B2 | 6/2017 | Wilkes, III et al. |
| 9,726,497 B1 | 8/2017 | Menon et al. |
| 9,727,920 B1 | 8/2017 | Healy et al. |
| 9,747,729 B2 | 8/2017 | Berkobin et al. |
| 9,767,622 B2 | 9/2017 | Pal et al. |
| 9,786,009 B2 | 10/2017 | Schumann, Jr. et al. |
| 9,786,103 B2 | 10/2017 | Menon et al. |
| 9,832,241 B1 | 11/2017 | Hayward |
| 9,758,095 B2 | 12/2017 | Briggs et al. |
| 9,841,287 B1 | 12/2017 | Hayward |
| 9,842,496 B1 | 12/2017 | Hayward |
| 9,848,289 B2 | 12/2017 | Fischer et al. |
| 9,851,214 B1 | 12/2017 | Chintakindi |
| 9,870,649 B1 | 1/2018 | Fields et al. |
| 9,881,342 B2 | 1/2018 | Helitzer et al. |
| 9,883,353 B2 | 1/2018 | Ng et al. |
| 9,892,363 B2 | 2/2018 | Cordova et al. |
| 9,892,573 B1 | 2/2018 | Hsu-Hoffman et al. |
| 9,904,289 B1 | 2/2018 | Hayward |
| 10,089,868 B1 | 2/2018 | Hayward |
| 9,922,567 B2 | 3/2018 | Molin et al. |
| 10,067,157 B2 | 4/2018 | Cordova et al. |
| 9,972,209 B1 | 5/2018 | Hayward |
| 9,984,419 B1 | 5/2018 | Manzella et al. |
| 9,984,420 B1 | 5/2018 | Manzella et al. |
| 9,990,781 B2 | 5/2018 | Haidar et al. |
| 9,990,782 B2 | 5/2018 | Rosenbaum |
| 10,005,471 B1 | 6/2018 | Brinkmann et al. |
| 10,119,989 B2 | 6/2018 | Avery |
| 10,026,131 B1 | 7/2018 | Dosher et al. |
| 10,026,237 B1 | 7/2018 | Fields et al. |
| 10,026,243 B1 | 7/2018 | Hsu-Hoffman et al. |
| 10,029,696 B1 | 7/2018 | Ferguson |
| 10,032,224 B2 | 7/2018 | Helitzer et al. |
| 10,032,320 B1 | 7/2018 | Menon et al. |
| 10,042,364 B1 | 7/2018 | Hayward |
| 10,042,363 B1 | 8/2018 | Hayward |
| 10,046,601 B1 | 8/2018 | Briggs et al. |
| 10,046,698 B2 | 8/2018 | Briggs et al. |
| 10,054,446 B2 | 8/2018 | Cordova et al. |
| 10,055,982 B1 | 8/2018 | Hayward |
| 10,057,312 B1 | 8/2018 | Hayward |
| 9,865,018 B2 | 9/2018 | Bowne et al. |
| 9,865,020 B1 | 9/2018 | Hayward et al. |
| 10,077,056 B1 | 9/2018 | Fields et al. |
| 10,078,099 B2 | 9/2018 | Cordova et al. |
| 10,078,871 B2 | 9/2018 | Sanchez et al. |
| 10,115,246 B1 | 10/2018 | Goldfarb et al. |
| 10,072,932 B2 | 11/2018 | Cordova et al. |
| 10,134,091 B2 | 11/2018 | Adams et al. |
| 10,154,382 B2 | 11/2018 | Matus |
| 9,995,584 B1 | 12/2018 | Kanevsky |
| 9,996,882 B1 | 12/2018 | Manzella et al. |
| 10,163,274 B1 | 12/2018 | Brickmann et al. |
| 10,163,275 B1 | 12/2018 | Brickmann et al. |
| 10,169,822 B2 | 1/2019 | Jarvis et al. |
| 10,185,455 B1 | 1/2019 | Mcquade et al. |
| 10,430,745 B2 | 1/2019 | Rani et al. |
| 10,430,883 B1 | 1/2019 | Bischoff et al. |
| 10,209,077 B2 | 2/2019 | Choudhury et al. |
| 10,210,479 B2 | 2/2019 | Rippel et al. |
| 10,214,144 B2 | 2/2019 | Cordova et al. |
| 10,239,538 B1 | 3/2019 | Fields et al. |
| 10,242,513 B1 | 3/2019 | Fields et al. |
| 10,402,907 B2 | 3/2019 | Bowne et al. |
| 10,403,057 B1 | 3/2019 | Fawcett et al. |
| 10,259,466 B2 | 4/2019 | Memani et al. |
| 10,272,923 B2 | 4/2019 | Yang et al. |
| 10,278,039 B1 | 4/2019 | Matus et al. |
| 10,309,785 B1 | 4/2019 | Menon et al. |
| 10,311,749 B1 | 4/2019 | Kypri et al. |
| 10,195,901 B2 | 5/2019 | Briggs et al. |
| 10,198,772 B2 | 5/2019 | Parameshwaran |
| 10,223,845 B1 | 5/2019 | Menon et al. |
| 10,296,977 B2 | 5/2019 | Chevrette |
| 10,304,138 B2 | 5/2019 | Menon et al. |
| 10,304,139 B2 | 5/2019 | Bowne et al. |
| 10,304,141 B1 | 5/2019 | Healy et al. |
| 10,304,265 B1 | 5/2019 | Hsu-Hoffman et al. |
| 10,304,329 B2 | 5/2019 | Matus et al. |
| 10,306,431 B1 | 5/2019 | Inciong et al. |
| 10,373,257 B1 | 6/2019 | Iqbal et al. |
| 10,373,497 B1 | 6/2019 | Hayward |
| 10,354,333 B1 | 7/2019 | Hayward |
| 10,354,461 B1 | 7/2019 | Hayward |
| 10,359,782 B1 | 7/2019 | Hayward |
| 10,360,794 B1 | 7/2019 | Hayward |
| 10,365,662 B1 | 7/2019 | Hayward |
| 10,366,605 B1 | 7/2019 | Hayward |
| 10,380,699 B2 | 8/2019 | Fernandes et al. |
| 10,384,688 B2 | 8/2019 | Lindelöf |
| 10,387,967 B1 | 8/2019 | Hayward et al. |

(56) References Cited

U.S. PATENT DOCUMENTS

| | | | |
|---|---|---|---|
| 10,392,022 | B1 | 8/2019 | Rau |
| 10,438,424 | B2 | 8/2019 | Hassib et al. |
| 10,440,451 | B2 | 8/2019 | Balakrishnan et al. |
| 10,346,925 | B2 | 9/2019 | Perl et al. |
| 10,349,219 | B2 | 9/2019 | Cordova et al. |
| 10,424,022 | B2 | 9/2019 | Bowne et al. |
| 10,410,288 | B2 | 10/2019 | Bowne et al. |
| 10,445,758 | B2 | 10/2019 | Bryer et al. |
| 10,449,967 | B1 | 10/2019 | Ferguson |
| 10,455,361 | B2 | 10/2019 | Cordova et al. |
| 10,460,394 | B2 | 10/2019 | Perl et al. |
| 10,504,188 | B2 | 10/2019 | Bowne et al. |
| 10,317,223 | B1 | 11/2019 | Hayward |
| 10,319,159 | B1 | 11/2019 | Menon et al. |
| 10,453,338 | B1 | 11/2019 | Hayward |
| 10,482,685 | B1 | 11/2019 | Lqbal et al. |
| 10,482,688 | B1 | 11/2019 | Mann et al. |
| 10,484,825 | B2 | 11/2019 | Fischer et al. |
| 10,486,709 | B1 | 11/2019 | Mezaael |
| 10,231,091 | B2 | 12/2019 | Fischer et al. |
| 10,231,093 | B2 | 12/2019 | Cordova et al. |
| 10,471,964 | B2 | 12/2019 | Johnson |
| 10,475,127 | B1 | 12/2019 | Potter et al. |
| 10,510,123 | B1 | 12/2019 | Konrardy et al. |
| 10,521,983 | B1 | 12/2019 | Hsu-Hoffman et al. |
| 10,540,723 | B1 | 1/2020 | Potter et al. |
| 10,546,042 | B2 | 1/2020 | Lavie et al. |
| 10,546,491 | B1 | 1/2020 | Hayward |
| 10,565,893 | B2 | 2/2020 | Mcquade et al. |
| 10,567,935 | B1 | 2/2020 | Inciong et al. |
| 10,668,930 | B1 | 2/2020 | Harvey et al. |
| 10,668,932 | B2 | 2/2020 | Hunt |
| 10,604,013 | B1 | 3/2020 | Briggs et al. |
| 10,553,042 | B1 | 4/2020 | Brinkmann et al. |
| 10,633,001 | B2 | 4/2020 | Ferguson et al. |
| 10,633,002 | B1 | 4/2020 | Ferguson |
| 10,643,287 | B1 | 5/2020 | Manzella et al. |
| 10,667,088 | B2 | 5/2020 | Cordova et al. |
| 10,699,498 | B1 | 6/2020 | Goldfarb et al. |
| 10,793,164 | B2 | 6/2020 | Likhterman et al. |
| 10,529,236 | B1 | 7/2020 | Balakrishnan |
| 10,703,379 | B1 | 7/2020 | Harvey et al. |
| 10,713,717 | B1 * | 7/2020 | Hanson .................. G06Q 40/04 |
| 10,771,945 | B2 | 8/2020 | Ossin et al. |
| 10,775,179 | B1 | 9/2020 | Hayward |
| 10,777,024 | B1 | 9/2020 | Brinkmann et al. |
| 10,783,790 | B2 | 9/2020 | Molin et al. |
| 10,803,213 | B2 | 10/2020 | Bhattacharyya et al. |
| 10,803,529 | B2 | 10/2020 | Adams et al. |
| 10,556,596 | B2 | 11/2020 | Krishnamurthy et al. |
| 10,559,038 | B1 | 11/2020 | Chen et al. |
| 10,559,196 | B2 | 11/2020 | Matus et al. |
| 10,740,859 | B2 | 11/2020 | Venugopalan et al. |
| 2013/0046510 | A1 | 2/2013 | Bowne et al. |
| 2014/0195100 | A1 * | 7/2014 | Lundsgaard ........... G07C 5/008 701/29.6 |
| 2016/0195406 | A1 | 7/2016 | Miles et al. |
| 2016/0196613 | A1 | 7/2016 | Miles et al. |
| 2016/0198306 | A1 | 7/2016 | Miles et al. |
| 2017/0057518 | A1 | 2/2017 | Finegold et al. |
| 2017/0140293 | A1 | 5/2017 | Vij et al. |
| 2017/0287076 | A1 | 5/2017 | Bowne et al. |
| 2017/0203767 | A1 | 7/2017 | Tibbits et al. |
| 2017/0210290 | A1 | 7/2017 | Cordova et al. |
| 2017/0303095 | A1 | 10/2017 | Cordova et al. |
| 2017/0294139 | A1 | 12/2017 | Cordova et al. |
| 2017/0364821 | A1 | 12/2017 | Mathur et al. |
| 2017/0365007 | A1 | 12/2017 | Huls |
| 2018/0025430 | A1 | 1/2018 | Perl et al. |
| 2018/0075380 | A1 | 3/2018 | Perl et al. |
| 2018/0158263 | A1 * | 6/2018 | Katta .................... G06Q 40/08 |
| 2018/0268626 | A1 | 9/2018 | Arashima et al. |
| 2018/0300816 | A1 | 10/2018 | Perl et al. |
| 2018/0013873 | A1 | 11/2018 | Farrell et al. |
| 2018/0338223 | A1 | 11/2018 | Park |
| 2019/0236859 | A1 | 1/2019 | Bradley |
| 2019/0005412 | A1 | 3/2019 | Matus et al. |
| 2019/0086210 | A1 | 3/2019 | Cordova et al. |
| 2019/0102840 | A1 | 4/2019 | Perl et al. |
| 2019/0208384 | A1 | 4/2019 | Matus et al. |
| 2019/0367039 | A1 | 5/2019 | Persia et al. |
| 2019/0182638 | A1 | 6/2019 | Cordova et al. |
| 2019/0193743 | A1 | 6/2019 | Memani et al. |
| 2019/0041423 | A1 | 7/2019 | Cordova et al. |
| 2019/0075435 | A1 | 7/2019 | Matus |
| 2019/0135177 | A1 | 9/2019 | Farrell et al. |
| 2019/0137275 | A1 | 9/2019 | Choudhury et al. |
| 2019/0287180 | A1 | 9/2019 | Vartanian et al. |
| 2019/0308503 | A1 | 10/2019 | Hannon |
| 2019/0311289 | A1 | 10/2019 | Nguyen |
| 2019/0320290 | A1 | 10/2019 | Cordova et al. |
| 2019/0375416 | A1 | 12/2019 | Rau |
| 2019/0394544 | A1 | 12/2019 | Balakrishnan et al. |
| 2020/0312062 | A1 | 1/2020 | Balakrishnan et al. |
| 2020/0312063 | A1 | 1/2020 | Balakrishnan et al. |
| 2020/0213825 | A1 | 2/2020 | Matus et al. |
| 2020/0126409 | A1 | 4/2020 | Matus et al. |
| 2020/0175786 | A1 | 4/2020 | Bongers et al. |
| 2020/0074326 | A1 | 5/2020 | Balakrishnan et al. |
| 2020/0074491 | A1 | 5/2020 | Scholl et al. |
| 2020/0168095 | A1 | 5/2020 | Balakrishnan |
| 2020/0202453 | A1 | 6/2020 | Sworski et al. |
| 2020/0322701 | A1 | 8/2020 | Balakrishnan et al. |
| 2020/0216081 | A1 | 9/2020 | Ferguson et al. |
| 2020/0219197 | A1 | 9/2020 | Fields et al. |
| 2020/0334762 | A1 | 10/2020 | Carver et al. |
| 2020/0334924 | A1 | 10/2020 | Wells et al. |
| 2020/0184404 | A1 | 11/2020 | Mezaael et al. |
| 2021/0004486 | A1 | 1/2021 | Adams et al. |
| 2022/0050925 | A1 * | 2/2022 | Gyllenram ............ H04W 12/02 |
| 2022/0108565 | A1 * | 4/2022 | Bjorkengren .......... G07C 5/008 |

OTHER PUBLICATIONS

Extended European Search Report corresponding to EP 22853920. 1; Date: May 14, 2025 (15 pp).

* cited by examiner

NORMALIZING AND SECURELY TRANSMITTING TELEMATICS DATA

CROSS-REFERENCE TO RELATED APPLICATIONS

This present application claims the benefit of priority under 35 U.S.C. § 119(e) to U.S. Provisional Patent Application No. 63/229,935, filed Aug. 5, 2021, and entitled "Device and Region Agnostic Mobile Telematics Data Normalization Service," the disclosure of which is hereby incorporated by reference in its entirety for all purposes.

TECHNICAL FIELD

The present disclosure generally relates to mobile phones, and more particularly, to the ability of mobile phones to track vehicle (e.g., fleet vehicles) and/or vehicle operator (e.g., fleet vehicle operator) information while ensuring appropriate privacy measures are implemented with regard to surfacing and/or transmitting the tracked information.

BACKGROUND

Recent advances in mobile device and data collection technologies have resulted in mobile devices that are capable of collecting information regarding actions taken by vehicles in which the mobile devices may be traveling. Determining when a mobile phone is taking a trip in a vehicle and/or when a user associated with the mobile phone is driving a vehicle, however, can be difficult. Further, making these determinations while also normalizing the data inputs from a variety of different mobile devices with different operating systems across many regions of the world can further increase this difficulty. Additionally, while collecting such information is one thing, to whom such information may be surfaced and transmitted is another issue altogether, one for which privacy concerns are particularly relevant.

BRIEF SUMMARY

Embodiments of the present disclosure may provide systems and methods for normalizing and securely transmitting information, for instance, telematics and other data, tracked and collected by mobile devices. In this regard, embodiments of the present disclosure may provide a data normalization service capable of normalizing data from any mobile phone in (or from users of) any region for purposes of tracking vehicle information (e.g., for fleet vehicles) and vehicle operator information (e.g., fleet vehicle operator behavior) for purposes of fleet management, insurance services, mobility services, and risk analysis. Further, embodiments of the present disclosure may provide a secure data transmission service capable of ensuring appropriate privacy measures are implemented with regard to surfacing and/or transmitting the tracked information. In aspects, one or more permissions regarding surfacing and/or transmitting the tracked information may be established based on the privacy settings of individuals (e.g., fleet vehicle operators) working under organizations (e.g., fleet management organizations). In aspects, one or more permissions regarding surfacing and/or transmitting the tracked information may be established based on the privacy settings of an individual leasing a vehicle. In aspects, one or more permissions may be configured for differing geographical regions to accommodate differing region-specific privacy regulations. The data normalization service and the secure data transmission service according to embodiments of the present disclosure may be integrated with a vehicle information system and/or data intelligence platforms, and also may be integrated with back-end systems of third parties, such as customers of the vehicle information system and/or data intelligence platforms.

One aspect of the present disclosure relates to a method for securely transmitting information, e.g., telematics and other data associated with vehicles (e.g., fleet vehicles) and/or vehicle operators (e.g., fleet vehicle operators). The method may include receiving telematics data from a mobile device associated with a first user (e.g., a fleet vehicle operator). The method may include normalizing the telematics data. The method may include, based on privacy settings derived from the mobile device associated with the first user, receiving permission, from the first user, to share the telematics data. The method may include, based on receiving permission, from the first user, to share the telematics data, transmitting at least a portion of the normalized telematics data to a second user (e.g., a fleet manager and/or a fleet management service).

Another aspect of the present disclosure relates to a system configured for securely transmitting information, e.g., telematics and other data associated with vehicles (e.g., fleet vehicles) and/or vehicle operators (e.g., fleet vehicle operators). The system may include one or more hardware processors configured by machine-readable instructions. The processor(s) may be configured to receive a user identification token from a mobile device associated with a first user (e.g., a fleet vehicle operator). The processor(s) may be configured to verify an identity of the first user utilizing the user identification token. The processor(s) may be configured to provide a positive response token to the mobile device associated with the first user indicating the identity of the first user has been verified. The processor(s) may be configured to, based on providing the positive response token, receive telematics data from the mobile device associated with the first user. The processor(s) may be configured to normalize the telematics data. The processor(s) may be configured to, based on privacy settings derived from the mobile device associated with the first user, receive permission, from the first user, to share the telematics data. The processor(s) may be configured to, based on receiving permission, from the first user, to share the telematics data, transmit at least a portion of the normalized telematics data to a second user (e.g., a fleet manager and/or a fleet management service).

Yet another aspect of the present disclosure relates to a non-transient computer-readable storage medium having instructions embodied thereon, the instructions being executable by one or more processors to perform a method for securely transmitting information e.g., telematics and other data associated with vehicles (e.g., fleet vehicles) and/or vehicle operators (e.g., fleet vehicle operators). The method may include receiving a user identification token from a mobile device associated with a first user (e.g., a fleet vehicle operator). The method may include verifying an identity of the first user utilizing the user identification token. The method may include providing a positive response token to the mobile device associated with the first user indicating the identity of the first user has been verified. The method may include, based on providing the positive response token, receiving telematics data, the user identification token, and a timestamp from the mobile device associated with the first user. The method may include normalizing the received telematics data. The method may include, based on privacy settings derived from the mobile device associated with the first user, receiving permission, from the first user, to share the telematics data. The method may include, based on receiving permission, from the first user, to share the telematics data, transmitting at least a portion of the normalized telematics data to a second user (e.g., a fleet manager and/or a fleet management service).

Still another aspect of the present disclosure relates to a system configured for securely transmitting information, e.g., telematics and other data associated with vehicles (e.g., fleet vehicles) and/or vehicle operators (e.g., fleet vehicle operators). The system may include means for receiving a user identification token from a mobile device associated with a first user (e.g., a fleet vehicle operator). The system may include means for verifying an identity of the first user utilizing the user identification token. The system may include means for providing a positive response token to the mobile device associated with the first user indicating the identity of the first user has been verified. The system may include means for, based on providing the positive response token, receiving telematics data, the user identification token, and a timestamp from the mobile device associated with the first user. The system may include means for normalizing the received telematics data. The system may include means for, based on privacy settings derived from the mobile device associated with the first user, receiving permission, from the first user, to share the telematics data. The system may include means for, based on receiving permission, from the first user, to share the telematics data, transmitting at least a portion of the normalized telematics data to a second user (e.g., a fleet manager and/or a fleet management service).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Figure 1:
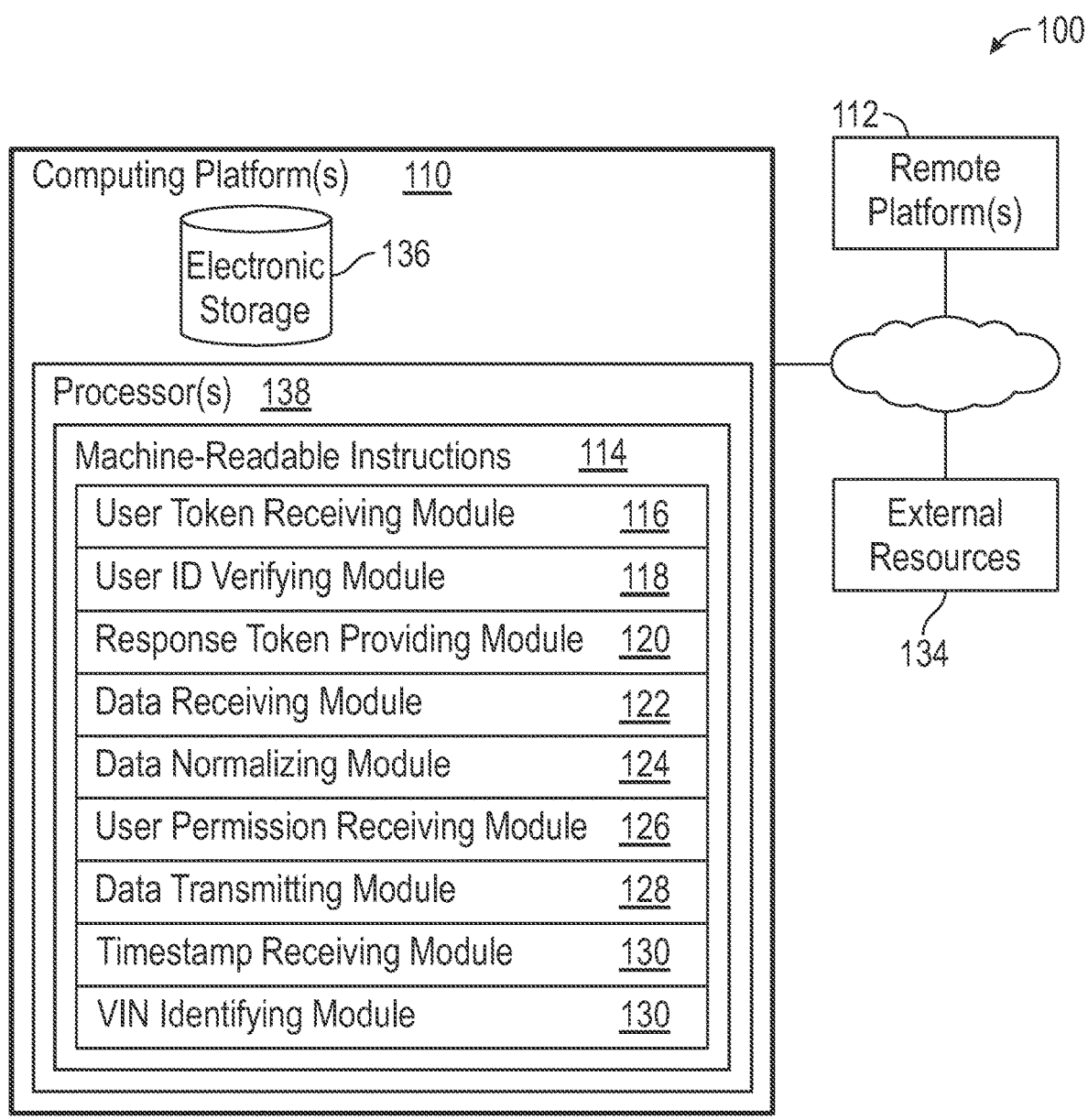
FIG. 1 illustrates a system configured for normalizing and securely transmitting information (for instance, telematics and/or other data, tracked and collected by mobile devices) according to certain aspects of the present disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

As previously set forth, recent advances in mobile device and data collection technologies have resulted in mobile devices that are capable of collecting information regarding actions taken by vehicles in which the mobile devices may be traveling. Determining when a mobile phone is taking a trip in a vehicle and/or when a user associated with the mobile phone is driving a vehicle, however, can be difficult. Further, making these determinations while also normalizing the data inputs from a variety of different mobile devices with different operating systems across many regions of the world can further increase this difficulty. Additionally, while collecting such information is one thing, to whom such information may be surfaced and transmitted is another issue altogether, one for which privacy concerns are particularly relevant.

Embodiments of the present disclosure may provide systems and methods for normalizing and securely transmitting information, for instance, telematics and other data, tracked and collected by mobile devices. In this regard, embodiments of the present disclosure may provide a data normalization service capable of normalizing data from any mobile phone in (or from users of) any region for purposes of tracking vehicle information (e.g., for fleet vehicles) and vehicle operator information (e.g., fleet vehicle operator behavior) for purposes of fleet management, insurance services, mobility services, and risk analysis. Further, embodiments of the present disclosure may provide a secure data transmission service capable of ensuring appropriate privacy measures are implemented with regard to surfacing and/or transmitting the tracked information. In aspects, one or more permissions regarding surfacing and/or transmitting the tracked information may be established based on the privacy settings of individuals (e.g., fleet vehicle operators) working under organizations (e.g., fleet management organizations). In aspects, one or more permissions regarding surfacing and/or transmitting the tracked information may be established based on the privacy settings of an individual leasing a vehicle. In aspects, one or more permissions may be configured for differing geographical regions to accommodate differing region-specific privacy regulations. The data normalization service and the secure data transmission service according to embodiments of the present disclosure may be integrated with a vehicle information system and/or data intelligence platforms, and also may be integrated with back-end systems of third parties, such as customers of the vehicle information system and/or data intelligence platforms.

With reference to FIG. 1, illustrated is a system 100 configured for normalizing data (for instance, telematics and/or other data, tracked and collected by mobile devices) and securely transmitting such data, according to certain aspects of the present disclosure. In some implementations, system 100 may include one or more computing platforms 110. Computing platform(s) 110 may be configured to communicate with one or more remote platforms 112 according to a client/server architecture, a peer-to-peer architecture, and/or other architectures. Remote platform(s) 112 may be configured to communicate with other remote platforms via computing platform(s) 110 and/or according to a client/server architecture, a peer-to-peer architecture, and/or other architectures. Users may access system 100 via remote platform(s) 112.

Computing platform(s) 110 may be configured by machine-readable instructions 114. Machine-readable instructions 114 may include one or more instruction modules. The instruction modules may include computer program modules. The instruction modules may include one or more of user token receiving module 116, user identification verifying module 118, response token providing module 120, data receiving module 122, data normalizing module 124, user permission receiving module 126, data transmitting module 128, timestamp receiving module 130, VIN identifying module 132, and/or other instruction modules.

User token receiving module 116 may be configured to receive a user token from a mobile device associated with a first user (e.g., a mobile telephone owned by or otherwise associated with a fleet vehicle operator). In aspects, user token receiving module 116 may be configured to receive the user token from the mobile device associated with the first user prior to receiving data (e.g., telematics and other data, tracked and collected by the mobile device associated with the first user) from the mobile device. In aspects, a user token received by user token receiving module 116 may contain information that may be useful in determining and/or verifying an identify of the first user.

User identification verifying module 118 may be configured to verify an identity of the first user. In aspects, user identification verifying module 118 may be configured to verify the identity of the first user utilizing a user identification token (e.g., a user identification token received by the user token receiving module 116).

Response token providing module 120 may be configured to provide a response token to the mobile device associated with the first user. In aspects, the response token may be a positive response token indicating that an identity of the first user has been verified (e.g., by user identification verifying module 118). In aspects, the response token maybe a negative response token indicating that the identity of the first user has not been verified. In aspects, the response token may be a null response token indicating that the identity of the first user cannot be verified, for instance, based upon a user identification token received by user identification verifying module 118.

Data receiving module 122 may be configured to receive data (e.g., telematics and/or other data) from the mobile device associated with the first user. In aspects, data receiving module 122 may be configured to receive data (e.g., telematics and/or other data) from the mobile device associated with the first user only when the response token providing module 120 has previously provided a positive response token indicating that the identify of the first user has been verified (e.g., by the user identification verifying module 118). In aspects, telematics data received by data receiving module 122 may include, without limitation, one or more of a vehicle location, vehicle acceleration data, vehicle deceleration data, data regarding sharp turns taken by the vehicle, vehicle travel paths, vehicle navigation, vehicle GPS information, vehicle fuel consumption, vehicle speed, vehicle location history, duration of one or more trips taken by the vehicle, relevant road, weather, traffic, and other mobility information.

Data normalizing module 124 may be configured to normalize data (e.g., telematics and/or other data) received, for instance, by the data receiving module 122. In this regard, data normalizing module 124 may provide a data normalization service capable of normalizing data from any mobile phone or other similar device in any region for purposes of tracking vehicles (e.g., fleet vehicles) and driver behavior (e.g., fleet vehicle driver behavior) for purposes including, but not limited to, fleet management, insurance services, mobility services, and/or risk analysis. The data normalization service according to embodiments of the present disclosure may be integrated with a vehicle information system, such as the vehicle information system described, for example, in Applicant's commonly owned U.S. Pat. No. 9,990,781, which is incorporated by reference herein in its entirety, and/or data intelligence platforms, such as Applicant's data intelligence platforms, and/or may be integrated with back-end system of one or more third parties, such as customers of the vehicle information system and/or data intelligence platforms.

Using a data normalization service according to embodiments of the present disclosure, mobile phones or other similar devices may be able to track information including, but not limited to, location, acceleration, deceleration, and sharp turns while driving as behavioral components of a fleet vehicle driver. More specifically, having the capability to determine when a mobile phone is taking a trip in a vehicle and/or when the mobile phone owner is driving a vehicle while also normalizing the data inputs from a variety of different mobile device with different operating systems across many regions of the world can be valuable for fleet managers, leasing companies, and/or insurance companies, among other entities, to track, manage, and assess risk with respect to an individual driver using a mobile phone or other similar device having an accelerometer that may be associated with the driver. The data normalization service according to embodiments of the present disclosure may ingest and normalize data to provide these types of services with data that they can use. This service also may integrate with a vehicle telematics platform such a provided by Applicant. In some embodiments of the present disclosure, a secure authorization process may be provided such that a phone may be used to report data on behalf of a specific vehicle identification number (VIN).

Figure 2:
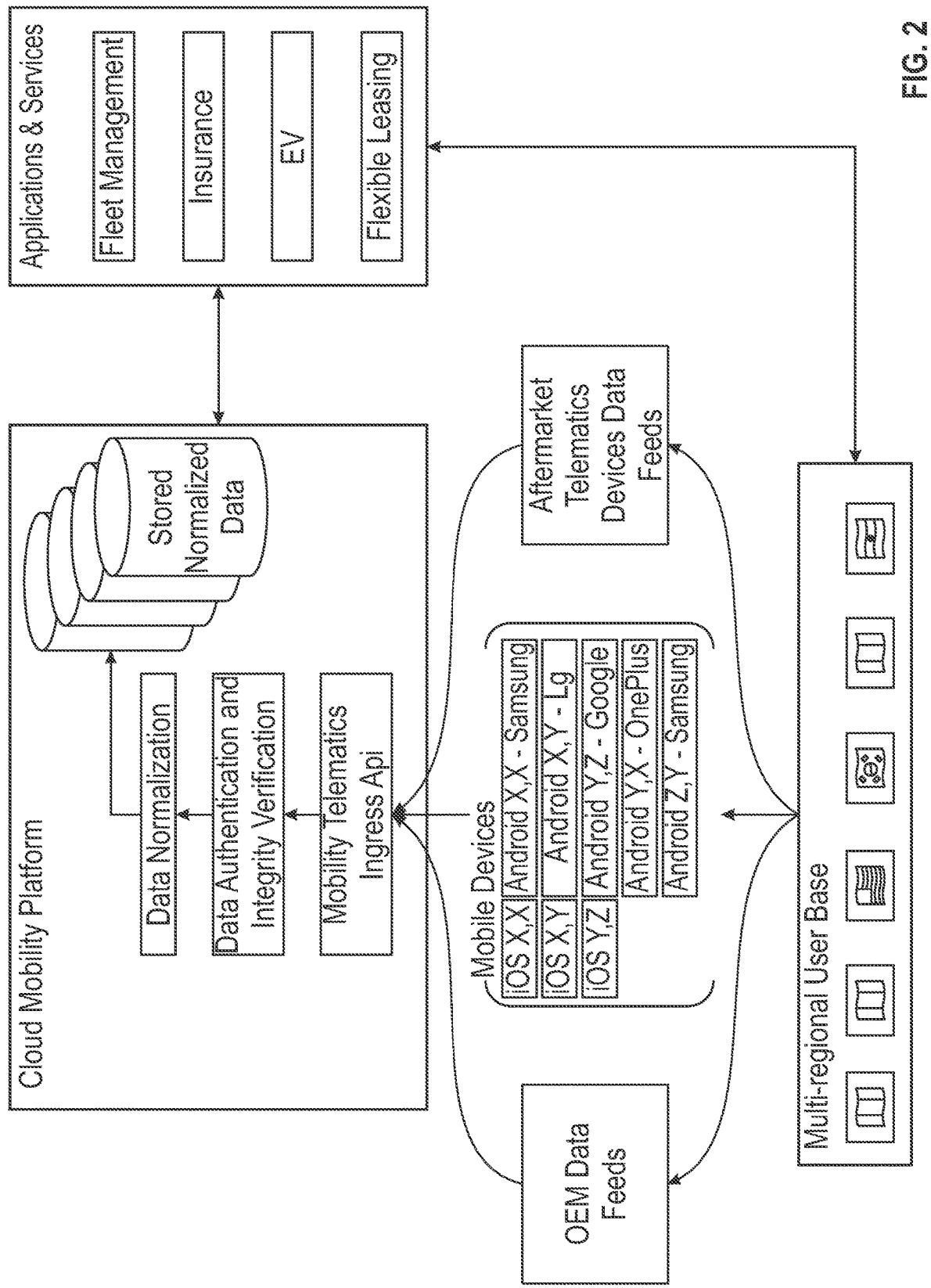
FIG. 2 depicts a device and region agnostic telematics data normalization service, in accordance with one or more implementations.

FIG. 2 depicts a device and region agnostic mobile telematics data normalization service according to an embodiment of the present disclosure. As set forth in FIG. 2, there may be a multi-regional user base. Accordingly, the users may be located in different regions, utilizing different languages, in accordance with embodiments of the present disclosure. The multi-regional user base may be utilizing one or more different types of mobile phone devices. As depicted herein, the mobile phone devices may include iOS devices running one or more different versions of the iOS operating system as well as Android operating system running on one or more different devices including, but not limited to, Samsung, LG, Google, and/or OnePlus. While different platforms, operating systems, and/or devices have been depicted herein, it should be appreciated that more or fewer platforms, operating systems, and/or devices may be provided for use as part of the mobile telematics data normalization service without departing from the present disclosure, particularly as the service is device-agnostic.

The multi-regional user base depicted in FIG. 2 may access original equipment manufacturer (OEM) data feeds and/or aftermarket telematics device data feeds in embodiments of the present disclosure. While certain data feeds are described herein, it should be appreciated that more or fewer or different data feeds may be provided without departing from the present disclosure. It should be appreciated that data feeding into an API may be manual (i.e., where a user uploads data) and/or automatic (i.e., where data may be continually streamed into the platform from one or more external sources such as a telematics service provider). These data feeds may than feed into a cloud mobility platform, and more specifically, a mobility telematics ingress application programming interface (API) as depicted in FIG. 2. When referring to a cloud-based platform, it should be appreciated the cloud-based platform may be provided through a cloud computing site, cloud environment, or cloud platform running multiple servers, computers, or virtual machines (e.g., a virtual machine host computer). The platform may be hosted in a cloud-based environment so that it may be shared and used by customers/users of the platform.

The mobility telematics ingress API within the cloud mobility platform may interact with portions of the cloud mobility platform that may provide for data authentication and integrity verification. Data authentication and integrity verification may include verifying permission for the one or more applications to consume normalized data, as will be described in more detail herein.

Data normalization may then occur, and the normalized data may be stored for use by one or more applications and services. By normalizing and processing the data, the platform according to embodiments of the present disclosure may answer questions but also identify questions that users may not realize should be asked, thereby providing business solutions through custom business services, custom applications, intelligent mobility ecosystems, and monetization. It should be appreciated that the platform according to embodiments of the present disclosure may consume all types in all formats including, but not limited to, video, audio, images, text, and/or time series. The datasets may be normalized into a universal data format. The platform according to embodiments of the present disclosure may be seeded with historical data but also take in new data in real time as it is generated.

The cloud mobility platform may then be used with one or more applications and services including, but not limited to, fleet management, insurance, electric vehicle management, and/or flexible leasing. It should be appreciated that fleet management may include, but is not limited to, providing one or more of vehicle location, acceleration, deceleration, sharp turns while driving, fuel consumption, speed, location history, duration of trip, VIN, year, make, and model. Such fleet management application may allow businesses to track and manage their vehicle fleets and may be customizable based on business need. Vehicle and location information may be pulled from enterprise vehicles through mobile devices associated with the vehicles. This information may be used by services and/or applications to allow for enterprise fleet tracking. Insurance providers may utilize stored normalized data that may be used to calculate a driver score that may be used by the insurance providers to provide a driver with a discount or lower rate. The score or data may be used for drivers to improve their driving habits and/or get better insurance rates.

While certain applications and services are depicted/described herein, it should be appreciated that more or fewer applications or services may be provided as part of the mobile telematics data normalization service without departing from the present disclosure. These applications and services may be accessed by, and information may be exchanged with, the multi-regional user base and/or the cloud mobility platform in embodiments of the present disclosure. It should be appreciated that the one or more applications may consume the normalized data and access one or more services without regard from which of the plurality of devices the normalized data originated.

Figure 3:
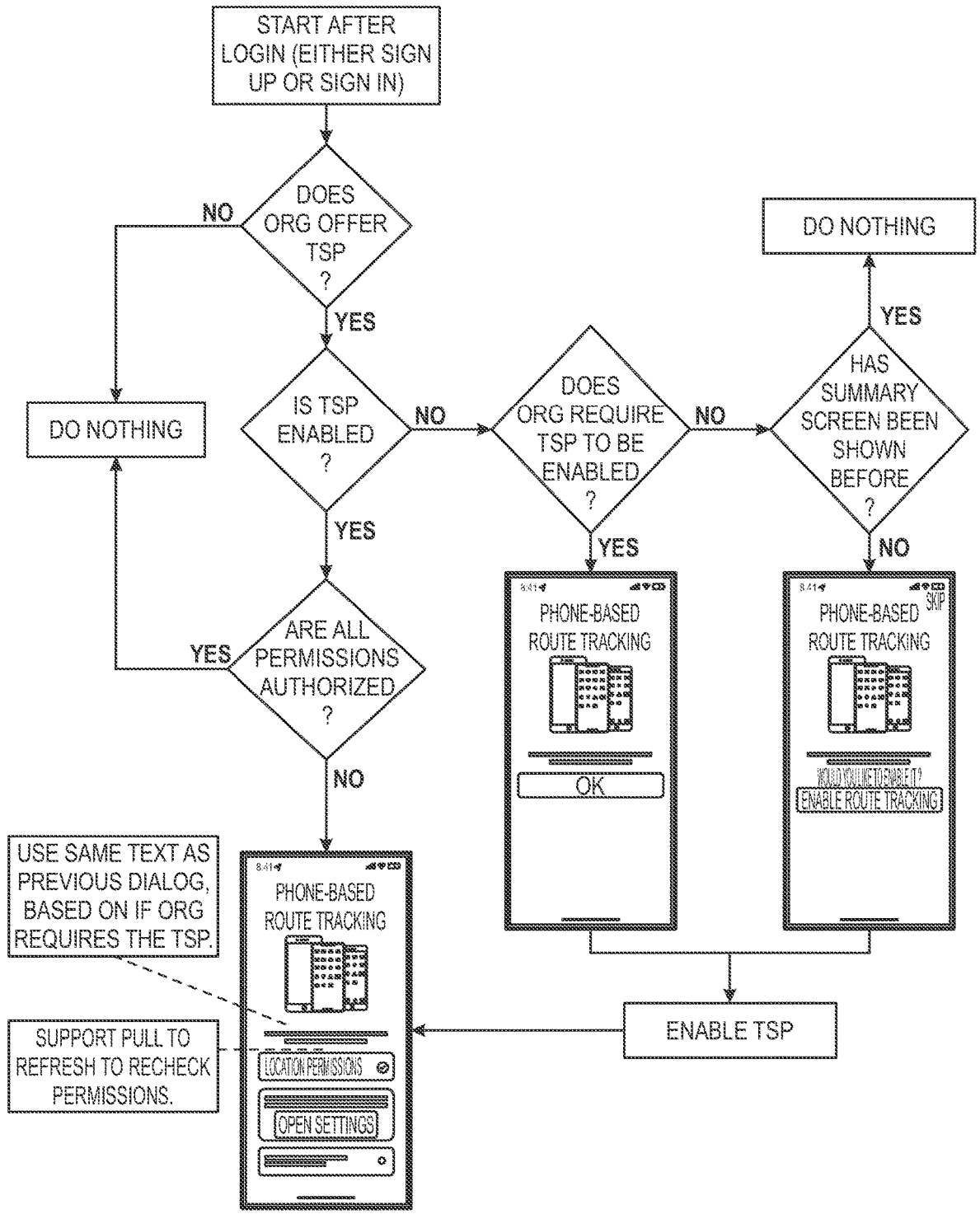
FIG. 3 depicts a device and region agnostic telematics data normalization service, in accordance with one or more implementations.

FIG. 3 depicts a flow of a device and region agnostic mobile telematics data normalization service according to an embodiment of the present disclosure. The flow begins after login, which may be after signing up or signing in according to embodiments of the present disclosure. After login, a determination may be made as to whether the organization offers TSP. The term "TSP" is used within the connected car industry as a term to categorize telematics service providers who play a role in the connected car value chain centered around secure vehicle to cloud data management. TSPs typically offer services to fleet operators, enabling them to monitor their vehicles and drivers. If it is not offered, then nothing is done. If it is offered, a determination may be made as to whether TSP is enabled. If it is enabled, a determination may be made as to whether all permissions are authorized, and if they are, then nothing is done. If TSP is not enabled, a determination may be made as to whether the organization may require TSP to be enabled. If so, TSP may then be enabled. If it is not required, an evaluation may be made as to whether a Summary screen has been shown in the past. If not, TSP may be enabled, and if so, nothing is done. Once TSP is enabled, a screen may be shown for phone-based route tracking. It may use the same text as the previous screen depending on whether the organization requires TSP. The screen also may support pull to refresh to recheck permissions.

When driver behavior or behavior components are referenced herein, it should be appreciated that this may include information relate to a driver's overall risk categorization as to safe driving. Behavior may include driver behavior, the risk based on driving habits including, but not limited to, aggressive inputs, erratic driving, and/or speeding. Behavior also may include vehicle conditions as well as travel patterns, all of which may be determined at least in part based on collection of data from mobile devices or other similar devices that may be normalized and used by one or more applications and services.

Returning now to FIG. 1, user permission receiving module 126 may be configured to receive permission, from the first user, to share collected, received, and/or normalized data (e.g., telematics and/or other data) with one or more second users (e.g., fleet managers and/or fleet management services). In aspects, one or more permissions may be received based on the privacy settings of individuals (e.g., fleet vehicle operators) working under organizations (e.g., fleet management organizations). In aspects, one or more permissions may be received based on the privacy settings of an individual leasing a vehicle. In aspects, one or more received permissions may be configured for differing geographical regions to accommodate differing region-specific privacy regulations. In aspects, user permission receiving module may be configured to receive permission, from the first user, to share collected, received and/or normalized data (e.g., telematics and/or other data) prior to transmitting the data (or at least a portion thereof) to the second user (e.g., via data transmitting module 128, more fully discussed below). In aspects, receiving permission, from the first user, to share the normalized telematics data may comprise receiving permission, from the first user, via an application on the mobile device associated with the first user.

Figure 4A:
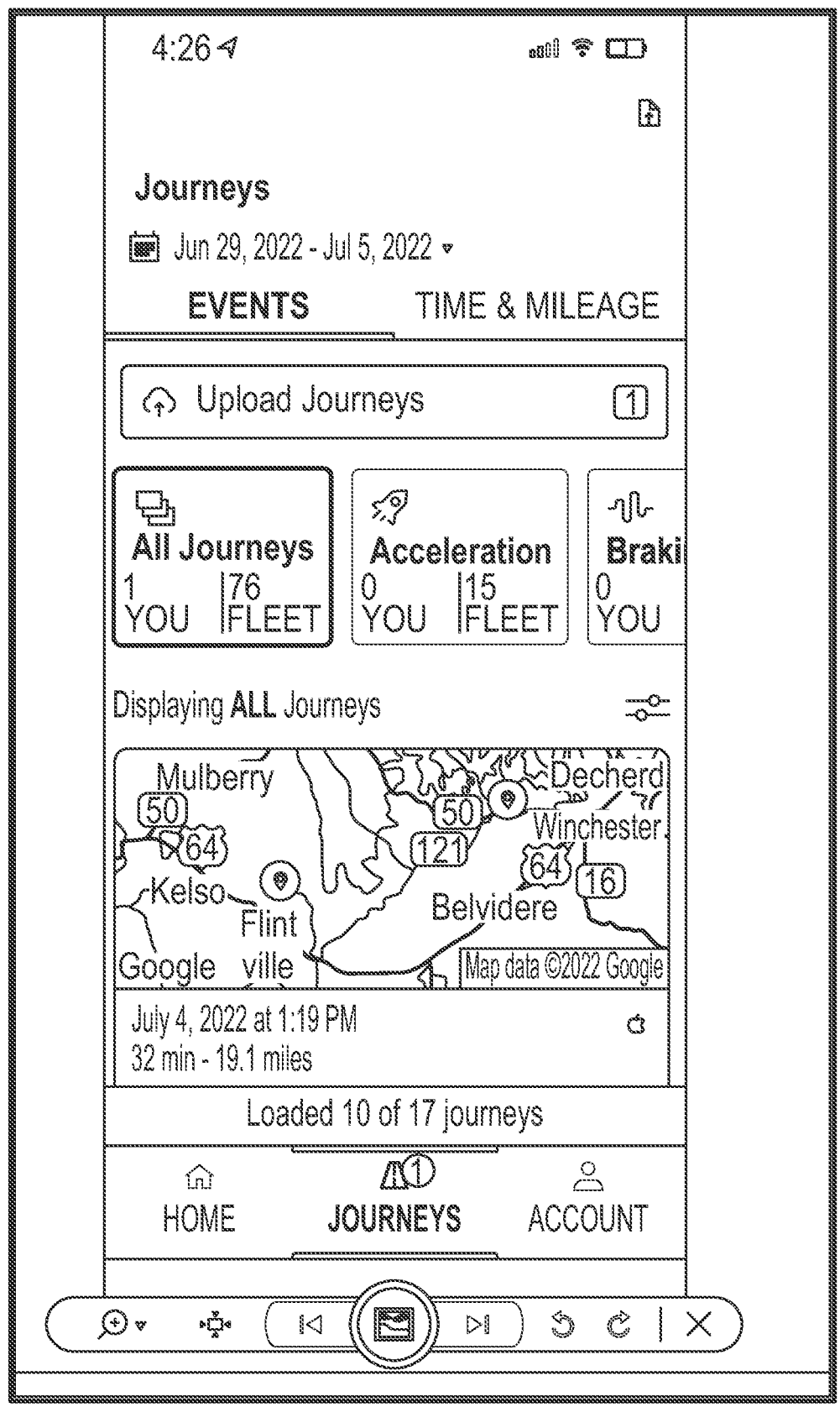
FIGS. 4A and 4B illustrate exemplary screen displays for ensuring appropriate permissions for transmitting information (e.g., telematics and/or other data, tracked and collected by mobile devices) are received from users (e.g., fleet vehicle operators) prior to information transmission, in accordance with one or more implementations.
Figure 4B:
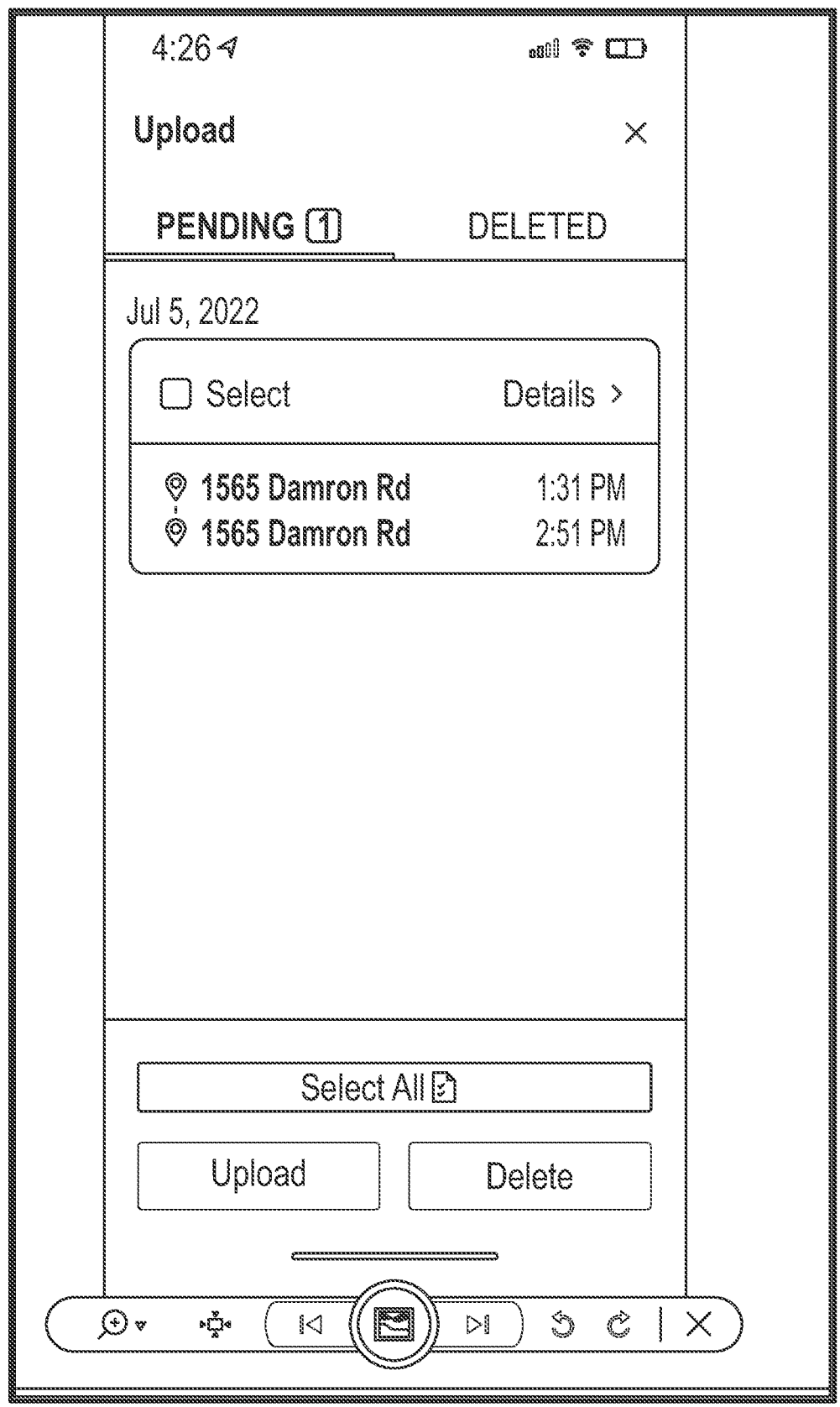

With reference to FIGS. 4A and 4B, exemplary displays are illustrated, in accordance with one or more implementations of the present disclosure, that may be shown in association with an application on the mobile device associated with the first user, the exemplary screen displays configured for ensuring appropriate permissions for transmitting information (e.g., telematics and/or other data, tracked and collected by mobile devices) are received from users (e.g., fleet vehicle operators) prior to information transmission.

FIG. 4A illustrates a landing screen display that illustrates that the user has a single pending journey associated with his/her mobile device. Should the user select "Upload Journeys" from illustrated screen display, the journey may be uploaded to and/or shared with a second user (e.g., a fleet manager and/or a fleet management service). If, however, the user desires more information prior to deciding whether to give upload/share permission, he/she may click on the "Journeys" button and be directed to the exemplary screen display of FIG. 4B where additional details regarding the pending journey is displayed. From here, the user may again select to have the journey uploaded to and/or shared with a second user (e.g., a fleet manager and/or a fleet management service). From the screen display of FIG. 4B, the user also may select to have the journey deleted, in which case the journey data will not be uploaded/shared. If the user takes no action to upload or delete the pending journey, the journey may remain in pending status until the user acts.

Returning back to FIG. 1, data transmitting module 128 may be configured to transmit data (e.g., telematics data and/or other data received from a mobile device associated with a first user, e.g., a fleet vehicle operator) to users (e.g., vehicle fleet managers and/or vehicle fleet management systems). In aspects, data transmitting module 128 may be configured to transmit normalized data to users. In aspects, data transmitting module 128 may be configured to, based on receiving permission from a first user (e.g., a vehicle driver) to share telematics data, transmit at least a portion of telematics data or normalized telematics data to a second user (e.g., a vehicle fleet manager and/or a vehicle fleet management system). In aspects, data transmitting module 128 may be configured to transmit data (e.g., telematics and/or other data) to the second user without transmitting a user identification token. In aspects, data transmitting module 128 may be configured to transmit a Vehicle Identification Number (VIN) to the second user.

Timestamp receiving module 130 may be configured to receive a timestamp associated with the data (e.g., telematics data) from the mobile device associated with the first user. In aspects, the timestamp may be useful in associating a VIN of a vehicle assigned to (or otherwise associated with) the first user at a time corresponding to the timestamp.

VIN identifying module 132 may be configured to identify a vehicle identification number (VIN) for a vehicle associated with one or both of a user identification token (e.g., received by the user token receiving module 116) and a timestamp (e.g., received by the timestamp receiving module 310). Identifying a VIN with a vehicle associated with the first user at a time corresponding to the timestamp permits data (e.g., telematics data) to be associated with the VIN rather than directly with the first user, thus enhancing the user's privacy regarding transmission of data.

In some implementations, computing platform(s) 110, remote platform(s) 112, and/or external resources 134 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 110, remote platform(s) 112, and/or external resources 134 may be operatively linked via some other communication media.

A given remote platform 112 may include one or more processors configured to execute computer program modules. The computer program modules may be configured to enable an expert or user associated with the given remote platform 112 to interface with system 100 and/or external resources 134, and/or provide other functionality attributed herein to remote platform(s) 112. By way of non-limiting example, a given remote platform 112 and/or a given computing platform 110 may include one or more of a server, a desktop computer, a laptop computer, a handheld computer, a tablet computing platform, a NetBook, a Smartphone, a gaming console, and/or other computing platforms.

External resources 134 may include sources of information outside of system 100, external entities participating with system 100, and/or other resources. In some implementations, some or all of the functionality attributed herein to external resources 134 may be provided by resources included in system 100.

Computing platform(s) 110 may include electronic storage 136, one or more processors 138, and/or other components. Computing platform(s) 110 may include communication lines, or ports to enable the exchange of information with a network and/or other computing platforms. Illustration of computing platform(s) 110 in FIG. 1 is not intended to be limiting. Computing platform(s) 110 may include a plurality of hardware, software, and/or firmware components operating together to provide the functionality attributed herein to computing platform(s) 110. For example, computing platform(s) 110 may be implemented by a cloud of computing platforms operating together as computing platform(s) 110.

Electronic storage 136 may comprise non-transitory storage media that electronically stores information. The electronic storage media of electronic storage 136 may include one or both of system storage that is provided integrally (i.e., substantially non-removable) with computing platform(s) 110 and/or removable storage that is removably connectable to computing platform(s) 110 via, for example, a port (e.g., a USB port, a firewire port, etc.) or a drive (e.g., a disk drive, etc.). Electronic storage 136 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 136 may include one or more virtual storage resources (e.g., cloud storage, a virtual private network, and/or other virtual storage resources). Electronic storage 136 may store software algorithms, information determined by processor(s) 138, information received from computing platform(s) 110, information received from remote platform(s) 112, and/or other information that enables computing platform(s) 110 to function as described herein.

Processor(s) 138 may be configured to provide information processing capabilities in computing platform(s) 110. As such, processor(s) 138 may include one or more of a digital processor, an analog processor, a digital circuit designed to process information, an analog circuit designed to process information, a state machine, and/or other mechanisms for electronically processing information. Although processor(s) 138 is shown in FIG. 1 as a single entity, this is for illustrative purposes only. In some implementations, processor(s) 138 may include a plurality of processing units. These processing units may be physically located within the same device, or processor(s) 138 may represent processing functionality of a plurality of devices operating in coordination. Processor(s) 138 may be configured to execute modules 116, 118, 120, 122, 124, 126, 128, 130, and/or 132, and/or other modules. Processor(s) 138 may be configured to execute modules 116, 118, 120, 122, 124, 126, 128, 130, and/or 132, and/or other modules by software; hardware; firmware; some combination of software, hardware, and/or firmware; and/or other mechanisms for configuring processing capabilities on processor(s) 138. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 116, 118, 120, 122, 124, 126, 128, 130, and/or 132 are illustrated in FIG. 1 as being implemented within a single processing unit, in implementations in which processor(s) 138 includes multiple processing units, one or more of modules 116, 118, 120, 122, 124, 126, 128, 130, and/or 132 may be implemented remotely from the other modules. The description of the functionality provided by the different modules 116, 118, 120, 122, 124, 126, 128, 130, and/or 132 described below is for illustrative purposes, and is not intended to be limiting, as any of modules 116, 118, 120, 122, 124, 126, 128, 130, and/or 132 may provide more or less functionality than is described. For example, one or more of modules 116, 118, 120, 122, 124, 126, 128, 130, and/or 132 may be eliminated, and some or all of its functionality may be provided by other ones of modules 116, 118, 120, 122, 124, 126, 128, 130, and/or 132. As another example, processor(s) 138 may be configured to execute one or more additional modules that may perform some or all of the functionality attributed below to one of modules 116, 118, 120, 122, 124, 126, 128, 130, and/or 132.

The techniques described herein may be implemented as method(s) that are performed by physical computing device(s); as one or more non-transitory computer-readable storage media storing instructions which, when executed by computing device(s), cause performance of the method(s); or as physical computing device(s) that are specially configured with a combination of hardware and software that causes performance of the method(s).

Figure 5:
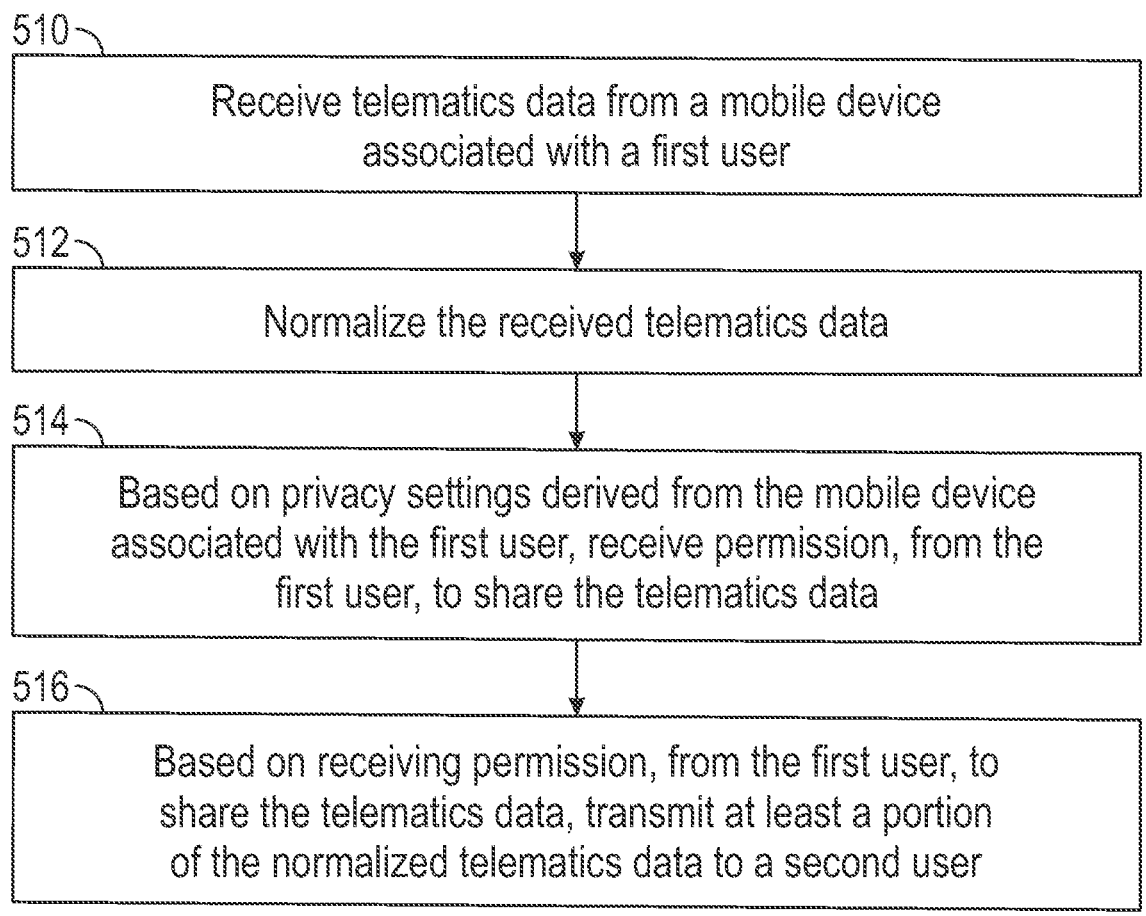
FIG. 5 illustrates an exemplary flow diagram for securely transmitting information (for instance, telematics and/or other data, tracked and collected by mobile devices), according to certain aspects of the disclosure.

Turning now to FIG. 5, illustrated is an exemplary flow diagram (e.g., process 500) for securely transmitting information, according to certain aspects of the disclosure. For explanatory purposes, the exemplary process 500 is described herein with reference to FIGS. 1, 2, 3, 4A, and 4B. Further for explanatory purposes, the steps of the exemplary process 500 are described herein as occurring in serial, or linearly. However, multiple instances of the example process 500 may occur in parallel.

At step 510, the process 500 may include receiving telematics data from a mobile device associated with a first user. By way of example and not limitation, the received telematics data may include one or more of a location of a vehicle, vehicle acceleration data, vehicle deceleration data, data regarding sharp turns taken by the vehicle, vehicle travel paths, vehicle navigation, vehicle GPS information, vehicle fuel consumption, vehicle speed, vehicle location history, duration of one or more trips taken by the vehicle, relevant road, weather, traffic, and other mobility information. In aspects, the received data may be specific to the first user (e.g., a fleet vehicle operator).

At step 512, the process 500 may include normalizing the telematics data (i.e., at least a portion of the data received at step 510). In aspects, normalizing the telematics data may be accomplished in accordance with the data normalization service depicted in FIGS. 2 and/or 3.

At step 514, the process 500 may include receiving permission, from the first user, to share the telematics data. In aspects, permission may be derived based on the privacy settings of individuals (e.g., fleet vehicle operators) working under organizations (e.g., fleet management organizations). In aspects, permission may be derived based on the privacy settings of an individual leasing a vehicle. In aspects, permission may be configured for differing geographical regions to accommodate differing region-specific privacy regulations. In aspects, permission may be received from the first user via an application on a mobile device associated with the first user. In aspects, permission may be received via user interfaces substantially similar to that shown in the exemplary screen displays of FIGS. 4A and 4B.

At step 516, the process 500 may include, based on receiving permission, from the first user, to share the data, transmitting at least a portion of the data (i.e., the normalized telematics data) to a second user (e.g., a vehicle fleet manager and/or fleet management service).

For example, as described above in relation to FIGS. 1, 2, 3, 4A and 4B at step 510, the process 500 may include receiving telematics data from a mobile device associated with a first user (e.g., through data receiving module 122 of the system 100 of FIG. 1). At step 512, the process 500 may include normalizing the mobile telematics data (e.g., through data normalizing module 124 of the system 100 of FIG. 1). At step 514, the process 500 may include, based on privacy settings derived from the mobile device associated with the first user, receiving permission, from the first user, to share the telematics data (e.g., through user permission receiving module 126 of the system 100 of FIG. 1). At step 516, the process 500 may include, based on receiving permission, from the first user, to share the telematics data, transmitting at least a portion of the normalized telematics data to a second user (e.g., through data transmitting module 128 of the system 100 of FIG. 1).

Figure 6:
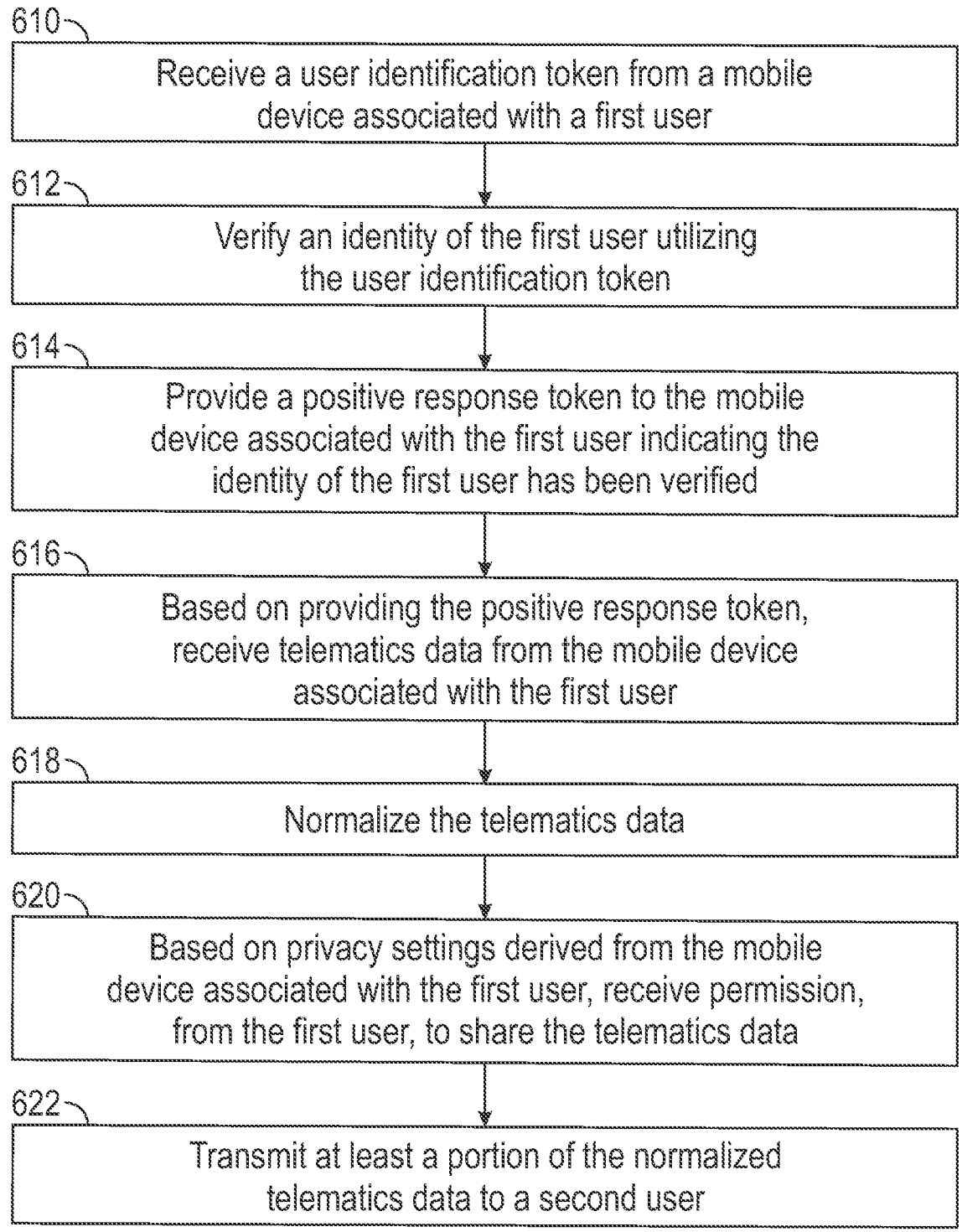
FIG. 6 illustrates an exemplary flow diagram for securely transmitting information (for instance, telematics and/or other data, tracked and collected by mobile devices), according to certain aspects of the disclosure.

FIG. 6 illustrates an exemplary flow diagram (e.g., process 600) for securely transmitting information, according to certain aspects of the disclosure. For explanatory purposes, the exemplary process 600 is described herein with reference to FIGS. 1, 2, 3, 4A, and 4B. Further for explanatory purposes, the steps of the exemplary process 600 are described herein as occurring in serial, or linearly. However, multiple instances of the example process 600 may occur in parallel.

At step 610, the process 600 may include receiving a user identification token from a mobile device associated with a first user. In aspects, the user identification token may contain information that may be useful in determining and/or verifying an identify of the first user.

At step 612, the process 600 may include verifying an identity of the first user utilizing the user identification token.

At step 614, the process 600 may include providing a positive response token to the mobile device associated with the first user indicating the identity of the first user has been verified.

At step 616, the process 600 may include, based on providing the positive response token, receiving telematics data from the mobile device associated with the first user. By way of example and not limitation, the received telematics data may include one or more of a location of a vehicle, vehicle acceleration data, vehicle deceleration data, data regarding sharp turns taken by the vehicle, vehicle travel paths, vehicle navigation, vehicle GPS information, vehicle fuel consumption, vehicle speed, vehicle location history, duration of one or more trips taken by the vehicle, relevant road, weather, traffic, and other mobility information. In aspects, the received data may be specific to the first user (e.g., a fleet vehicle operator).

At step 618, the process 600 may include normalizing the telematics data (i.e., at least a portion of the data received at step 616). In aspects, normalizing the telematics data may be accomplished in accordance with the data normalization service depicted in FIGS. 2 and/or 3.

At step 620, the process 600 may include receiving permission, from the first user, to share the telematics data. In aspects, permission may be derived based on the privacy settings of individuals (e.g., fleet vehicle operators) working under organizations (e.g., fleet management organizations). In aspects, permission may be derived based on the privacy settings of an individual leasing a vehicle. In aspects, permission may be configured for differing geographical regions to accommodate differing region-specific privacy regulations. In aspects, permission may be received from the first user via an application on a mobile device associated with the first user. In aspects, permission may be received via user interfaces substantially similar to that shown in the exemplary screen displays of FIGS. 4A and 4B.

At step 622, the process 600 may include, based on receiving permission from the first user, to share the normalized telematics data, transmitting at least a portion of the normalized telematics data to a second user. transmitting at least a portion of the normalized telematics data to a second user (e.g., a vehicle fleet manager and/or fleet management service).

For example, as described above in relation to FIGS. 1, 2, 3, 4A, and 4B, at step 610, the process 600 may include receiving a user identification token from a mobile device associated with a first user (e.g., through user token receiving module 116 of the system 100 of FIG. 1). At step 612, the process 600 may include verifying an identity of the first user utilizing the user identification token (e.g., through user ID verifying module 118 of the system 100 of FIG. 1). At step 614, the process 600 may include providing a positive response token to the mobile device associated with the first user indicating the identity of the first user has been verified (e.g., through response token providing module 120 of the system 100 of FIG. 1). At step 616, the process 600 may include, based on providing the positive response token, receiving telematics data from the mobile device associated with the first user (e.g., through data receiving module 122 of the system 100 of FIG. 1). At step 618, the process 600 may include normalizing the telematics data (e.g., through data normalizing module 124 of the system 100 of FIG. 1). At step 620, the process 600 may include, based on privacy settings derived from the mobile device associated with the first user, receiving permission, from the first user, to share the telematics data (e.g., through user permission receiving module 126 of the system 100 of FIG. 1). At step 622, the process 600 may include transmitting at least a portion of the normalized telematics data to a second user (e.g., through data transmitting module 128 of the system 100 of FIG. 1).

Figure 7:
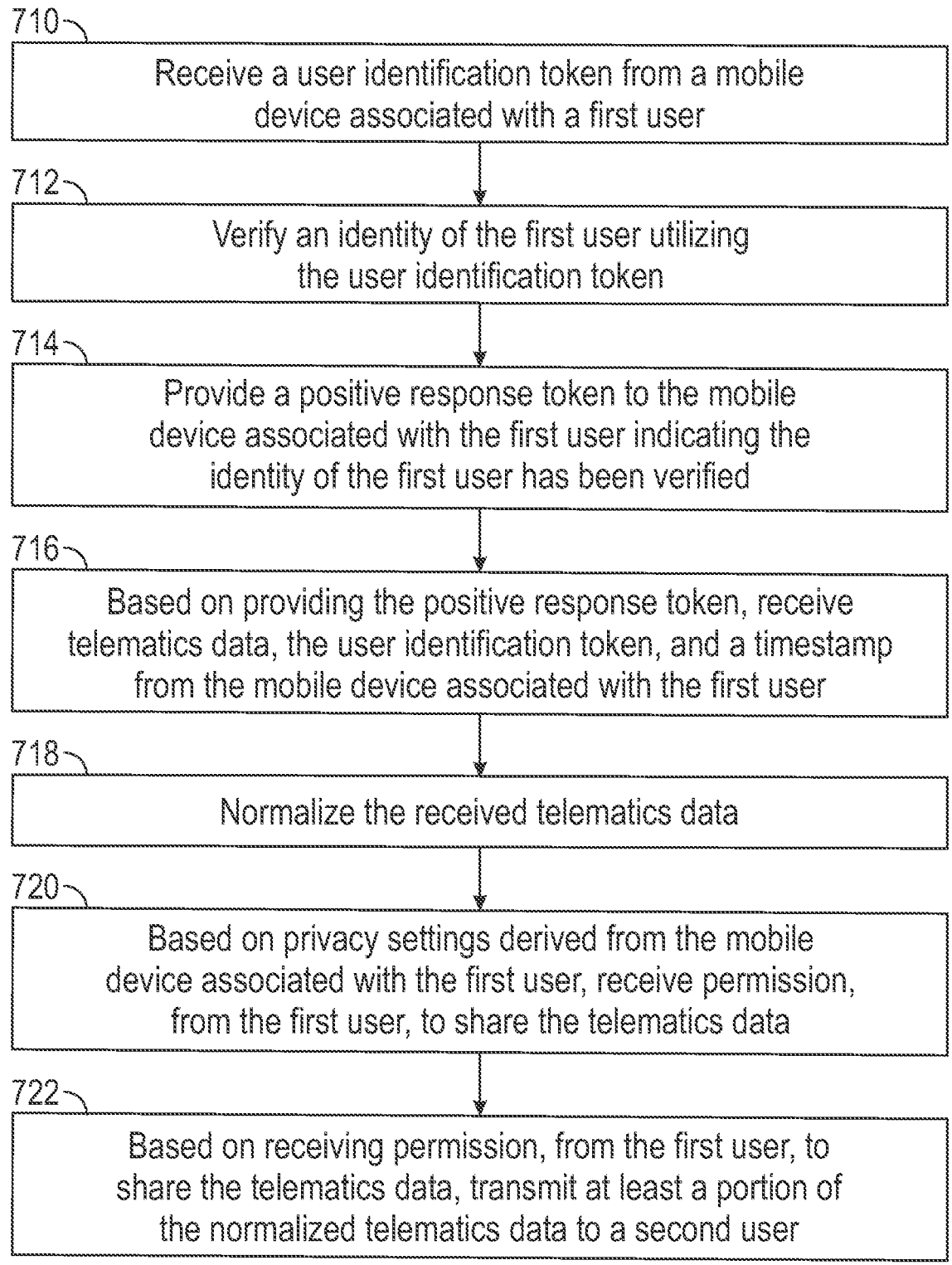
FIG. 7 illustrates an exemplary flow diagram for securely transmitting information (for instance, telematics and/or other data, tracked and collected by mobile devices), according to certain aspects of the disclosure.

FIG. 7 illustrates an exemplary flow diagram (e.g., process 700) for securely transmitting information, according to certain aspects of the disclosure. For explanatory purposes, the exemplary process 700 is described herein with reference to FIGS. 1, 2, 3, 4A, and 4B. Further for explanatory purposes, the steps of the exemplary process 700 are described herein as occurring in serial, or linearly. However, multiple instances of the example process 600 may occur in parallel.

At step 710, the process 700 may include receiving a user identification token from a mobile device associated with a first user. In aspects, the user identification token may contain information that may be useful in determining and/or verifying an identify of the first user.

At step 712, the process 700 may include verifying an identity of the first user utilizing the user identification token.

At step 714, the process 700 may include providing a positive response token to the mobile device associated with the first user indicating the identity of the first user has been verified.

At step 716, the process 700 may include, based on providing the positive response token, receiving telematics data, the user identification token, and a timestamp from the mobile device associated with the first user. By way of example and not limitation, the received telematics data may include one or more of a location of a vehicle, vehicle acceleration data, vehicle deceleration data, data regarding sharp turns taken by the vehicle, vehicle travel paths, vehicle navigation, vehicle GPS information, vehicle fuel consumption, vehicle speed, vehicle location history, duration of one or more trips taken by the vehicle, relevant road, weather, traffic, and other mobility information. In aspects, the received data may be specific to the first user (e.g., a fleet vehicle operator).

At step 718, the process 700 may include normalizing the received telematics data (i.e., at least a portion of the data received at step 716). In aspects, normalizing the telematics data may be accomplished in accordance with the data normalization service depicted in FIGS. 2 and/or 3.

At step 720, the process 700 may include receiving permission, from the first user, to share the telematics data. In aspects, permission may be derived based on the privacy settings of individuals (e.g., fleet vehicle operators) working under organizations (e.g., fleet management organizations). In aspects, permission may be derived based on the privacy settings of an individual leasing a vehicle. In aspects, permission may be configured for differing geographical regions to accommodate differing region-specific privacy regulations. In aspects, permission may be received from the first user via an application on a mobile device associated with the first user. In aspects, permission may be received via user interfaces substantially similar to that shown in the exemplary screen displays of FIGS. 4A and 4B.

At step 722, the process 700 may include, based on receiving permission, from the first user, to share the normalized telematics data, transmitting at least a portion of the normalized telematics data to a second user (e.g., a fleet manager and/or a fleet management service).

For example, as described above in relation to FIGS. 1, 2, 3, 4A, and 4B, at step 710, the process 700 may include receiving a user identification token from a mobile device associated with a first user (e.g., through user token receiving module 116 of the system 100 of FIG. 1). At step 712, the process 700 may include verifying an identity of the first user utilizing the user identification token (e.g., through user ID verifying module 118 of the system 100 of FIG. 1). At step 714, the process 700 may include providing a positive response token to the mobile device associated with the first user indicating the identity of the first user has been verified (e.g., through response token providing module 120 of the system 100 of FIG. 1). At step 716, the process 700 may include, based on providing the positive response token, receiving telematics data, the user identification token, and a timestamp from the mobile device associated with the first user (e.g., through data receiving module 122, user token receiving module 116, and timestamp receiving module 130 of the system 100 of FIG. 1). At step 718, the process 700 may include normalizing the received telematics data (e.g., data normalizing module 124 of the system 100 of FIG. 1). At step 720, the process 700 may include, based on privacy settings derived from the mobile device associated with the first user, receiving permission, from the first user, to share the telematics data (e.g., through user permission receiving module 126 of the system 100 of FIG. 1). At step 722, the process may include, based on receiving permission, from the first user, to share the telematics data, transmitting at least a portion of the normalized telematics data to a second user (e.g., through data transmitting module 128 of the system 100 of FIG. 1).

Figure 8:
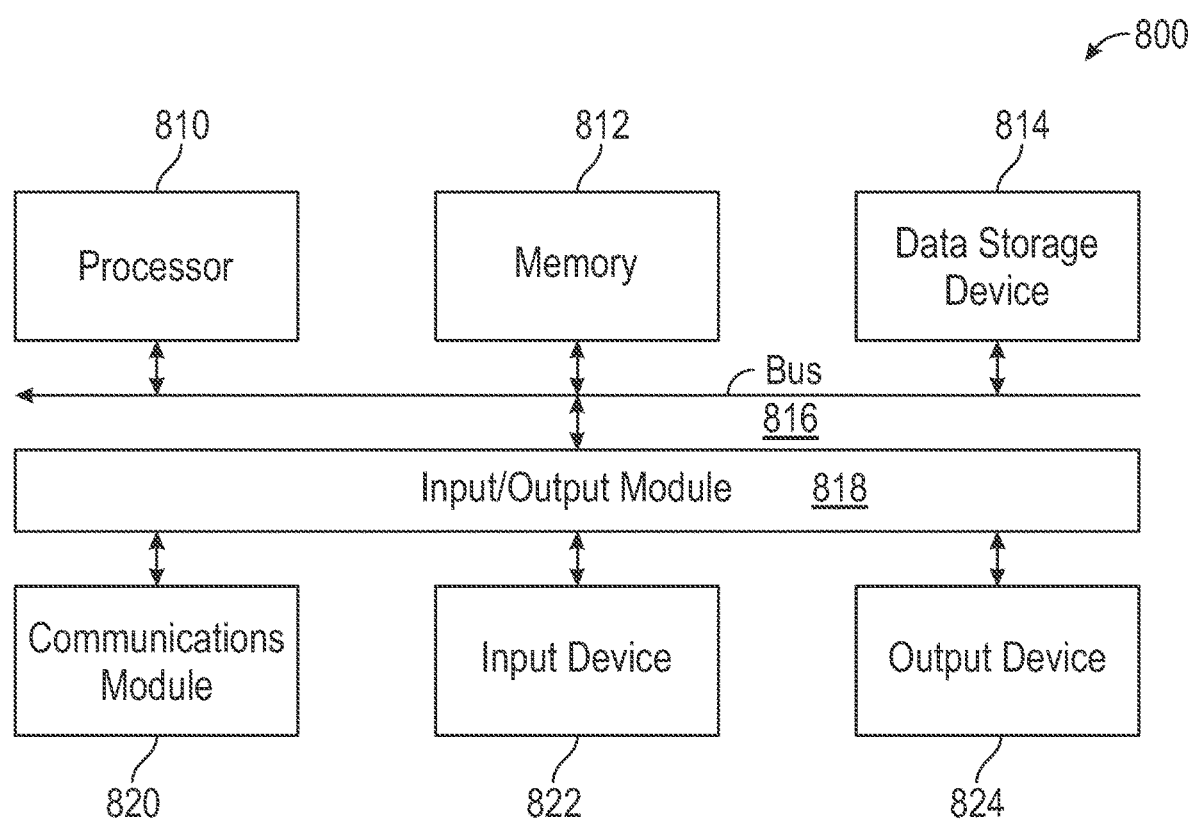
FIG. 8 is a block diagram illustrating an exemplary computer system (e.g., representing both client and server) with which aspects of the subject technology can be implemented.

FIG. 8 is a block diagram illustrating an exemplary computer system 800 with which aspects of the subject technology can be implemented. In certain aspects, the computer system 800 may be implemented using hardware or a combination of software and hardware, either in a dedicated server, integrated into another entity, or distributed across multiple entities.

Computer system 800 (e.g., server and/or client) includes a bus 816 or other communication mechanism for communicating information, and a processor 810 coupled with bus 816 for processing information. By way of example, the computer system 800 may be implemented with one or more processors 810. Processor 810 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 800 can include, in addition to hardware, code that creates an execution environment for the computer program in question, e.g., code that constitutes processor firmware, a protocol stack, a database management system, an operating system, or a combination of one or more of them stored in an included memory 812, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 816 for storing information and instructions to be executed by processor 810. The processor 810 and the memory 812 can be supplemented by, or incorporated in, special purpose logic circuitry.

The instructions may be stored in the memory 812 and implemented in one or more computer program products, i.e., one or more modules of computer program instructions encoded on a computer readable medium for execution by, or to control the operation of, the computer system 800, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 812 may also be used for storing temporary variable or other intermediate information during execution of instructions to be executed by processor 810.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 800 further includes a data storage device 814 such as a magnetic disk or optical disk, coupled to bus 816 for storing information and instructions. Computer system 800 may be coupled via input/output module 818 to various devices. The input/output module 818 can be any input/output module. Exemplary input/output modules 818 include data ports such as USB ports. The input/output module 818 is configured to connect to a communications module 820. Exemplary communications modules 820 include networking interface cards, such as Ethernet cards and modems. In certain aspects, the input/output module 818 is configured to connect to a plurality of devices, such as an input device 822 and/or an output device 824. Exemplary input devices 822 include a keyboard and a pointing device, e.g., a mouse or a trackball, by which a user can provide input to the computer system 800. Other kinds of input devices 822 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 824 include display devices such as an LCD (liquid crystal display) monitor, for displaying information to the user.

According to one aspect of the present disclosure, the above-described systems can be implemented using a computer system 800 in response to processor 810 executing one or more sequences of one or more instructions contained in memory 812. Such instructions may be read into memory 812 from another machine-readable medium, such as data storage device 814. Execution of the sequences of instructions contained in the main memory 812 causes processor 810 to perform the process steps described herein. One or more processors in a multi-processing arrangement may also be employed to execute the sequences of instructions contained in memory 812. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 800 can include clients and servers. A client and server are generally remote from each other and typically interact through a communication network. The relationship of client and server arises by virtue of computer programs running on the respective computers and having a client-server relationship to each other. Computer system 800 can be, for example, and without limitation, a desktop computer, laptop computer, or tablet computer. Computer system 800 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 810 for execution. Such a medium may take many forms, including, but not limited to, non-volatile media, volatile media, and transmission media. Non-volatile media include, for example, optical or magnetic disks, such as data storage device 814. Volatile media include dynamic memory, such as memory 812. Transmission media include coaxial cables, copper wire, and fiber optics, including the wires that comprise bus 816. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 800 reads data, information may be read from the data and stored in a memory device, such as the memory 812. Additionally, data from the memory 812 servers accessed via a network the bus 816, or the data storage 814 may be read and loaded into the memory 812. Although data is described as being found in the memory 812, it will be understood that data does not have to be stored in the memory 812 and may be stored in other memory accessible to the processor 810 or distributed among several media, such as the data storage 814.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more". All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for securely transmitting information, the method comprising:
    receiving telematics data from a mobile device associated with a first user, at least a portion of the telematics data comprising movement data that is generated on the mobile device based on movement detected by the mobile device, the mobile device being physically detached from a vehicle transporting the first user;
    normalizing the received telematics data;
    based on privacy settings derived from the mobile device associated with the first user, receiving permission, from the first user, to share the telematics data; and
    based on receiving permission, from the first user, to share the telematics data, transmitting at least a portion of the normalized telematics data to a second user,
    wherein receiving permission, from the first user, to share the telematics data comprises receiving permission, from the first user, via an application on the mobile device associated with the first user.

2. The computer-implemented method of claim 1, further comprising:
    prior to receiving telematics data from the mobile device associated with the first user, receiving a user identification token from a mobile device associated with the first user;
    verifying an identity of the first user utilizing the user identification token; and
    providing a positive response token to the mobile device associated with the first user indicating the identity of the first user has been verified.

3. The computer-implemented method of claim 2, wherein receiving the telematics data from the mobile device associated with the first user comprises receiving the telematics data from the mobile device associated with the first user based on providing the positive response token to the mobile device associated with the first user.

4. The computer-implemented method of claim 3, further comprising receiving a timestamp associated with the received telematics data from the mobile device associated with the first user.

5. The computer-implemented method of claim 4, further comprising identifying a vehicle identification number for the vehicle, which is associated with the user identification token and the timestamp.

6. The computer-implemented method of claim 5, wherein transmitting at least the portion of the normalized telematics data to the second user comprises transmitting the vehicle identification number and at least the portion of the normalized telematics data to the second user without transmitting the user identification token.

7. The computer-implemented method of claim 1, wherein at least a portion of the privacy settings derived from the mobile device associated with the first user, are derived from geographical-region-specific privacy regulations.

8. A system configured for securely transmitting information, the system comprising:
    one or more hardware processors configured by machine-readable instructions to:
        receive a user identification token from a mobile device associated with a first user;
        verify an identity of the first user utilizing the user identification token;
        based on providing the positive response token, receive telematics data from the mobile device associated with the first user, at least a portion of the telematics data comprising movement data that is generated on the mobile device based on movement detected by the mobile device, the mobile device being physically detached from a vehicle transporting the first user;
        normalize the telematics data;
        based on privacy settings derived from the mobile device associated with the first user, receive permission, from the first user, to share the telematics data and
        based on receiving permission, from the first user, to share the telematics data, transmit at least a portion of the normalized telematics data to a second user,
        wherein receiving permission, from the first user, to share the telematics data comprises receiving permission, from the first user, via an application on the mobile device associated with the first user.

9. The system of claim 8, wherein the one or more hardware processors are further configured by machine-readable instructions to receive a timestamp associated with the telematics data from the mobile device associated with the first user.

10. The system of claim 9, wherein the one or more hardware processors are further configured by machine-readable instructions to identify a vehicle identification number for the vehicle, which is associated with the user identification token and the timestamp.

11. The system of claim 10, wherein the one or more hardware processors are configured to transmit at least the portion of the normalized telematics data to the second user by transmitting the vehicle identification number and at least a portion of the normalized telematics data to the second user without transmitting the user identification token.

12. The system of claim 11, wherein transmitting the vehicle identification number and at least the portion of the normalized telematics data to a second user without transmitting the user identification token comprises transmitting the vehicle identification number and at least the portion of the normalized telematics data to the second user based on receiving permission, from the first user, to share the telematics data.

13. The system of claim 8, wherein permission is received, from the first user, to share the telematics data via an application on the mobile device associated with the first user.

14. The system of claim 8, wherein at least a portion of the privacy settings derived from the mobile device associated with the first user, are derived from geographical-region-specific privacy regulations.

15. A non-transient computer-readable storage medium having instructions embodied thereon, the instructions being executable by one or more processors to perform a method for securely transmitting information, the method comprising:

receiving a user identification token from a mobile device associated with a first user;

verifying an identity of the first user utilizing the user identification token;

providing a positive response token to the mobile device associated with the first user indicating the identity of the first user has been verified;

based on providing the positive response token, receiving telematics data, the user identification token, and a timestamp from the mobile device associated with the first user, at least a portion of the telematics data comprising movement data that is generated on the mobile device based on movement detected by the mobile device, the mobile device being physically detached from a vehicle transporting the first user;

normalizing the received telematics data;

based on privacy settings derived from the mobile device associated with the first user, receiving permission, from the first user, to share the telematics data; and based on receiving permission, from the first user, to share the telematics data, transmitting at least a portion of the normalized telematics data to a second user, wherein receiving permission, from the first user, to share the telematics data comprises receiving permission, from the first user, via an application on the mobile device associated with the first user.

16. The computer-readable storage medium of claim 15, wherein the method further comprises identifying a vehicle identification number for the vehicle, which is associated with the user identification token and the timestamp.

17. The computer-readable storage medium of claim 16, wherein transmitting at least the portion of the normalized telematics data to the second user comprises transmitting the vehicle identification number and at least the portion of the normalized telematics data to the second user without transmitting the user identification token.

18. The system of claim 15, wherein at least a portion of the privacy settings derived from the mobile device associated with the first user, are derived from geographical-region-specific privacy regulations.

* * * * *